(No Model.) 4 Sheets—Sheet 1.
W. H. COSPER.
MACHINE FOR MANUFACTURING WEATHER STRIPPING.
No. 432,726. Patented July 22, 1890.

Witnesses
Timothy Stebbins
Louis P. Le Vino.

Inventor
William H. Cooper.
By Attorney Geo. W. LeVin.

(No Model.) 4 Sheets—Sheet 3.

W. H. COSPER.
MACHINE FOR MANUFACTURING WEATHER STRIPPING.

No. 432,726. Patented July 22, 1890.

Witnesses
Timothy Stebbins
Louis P. Le Vin.

Inventor
William H. Cosper.
By Geo. W. Le Vin.
Attorney

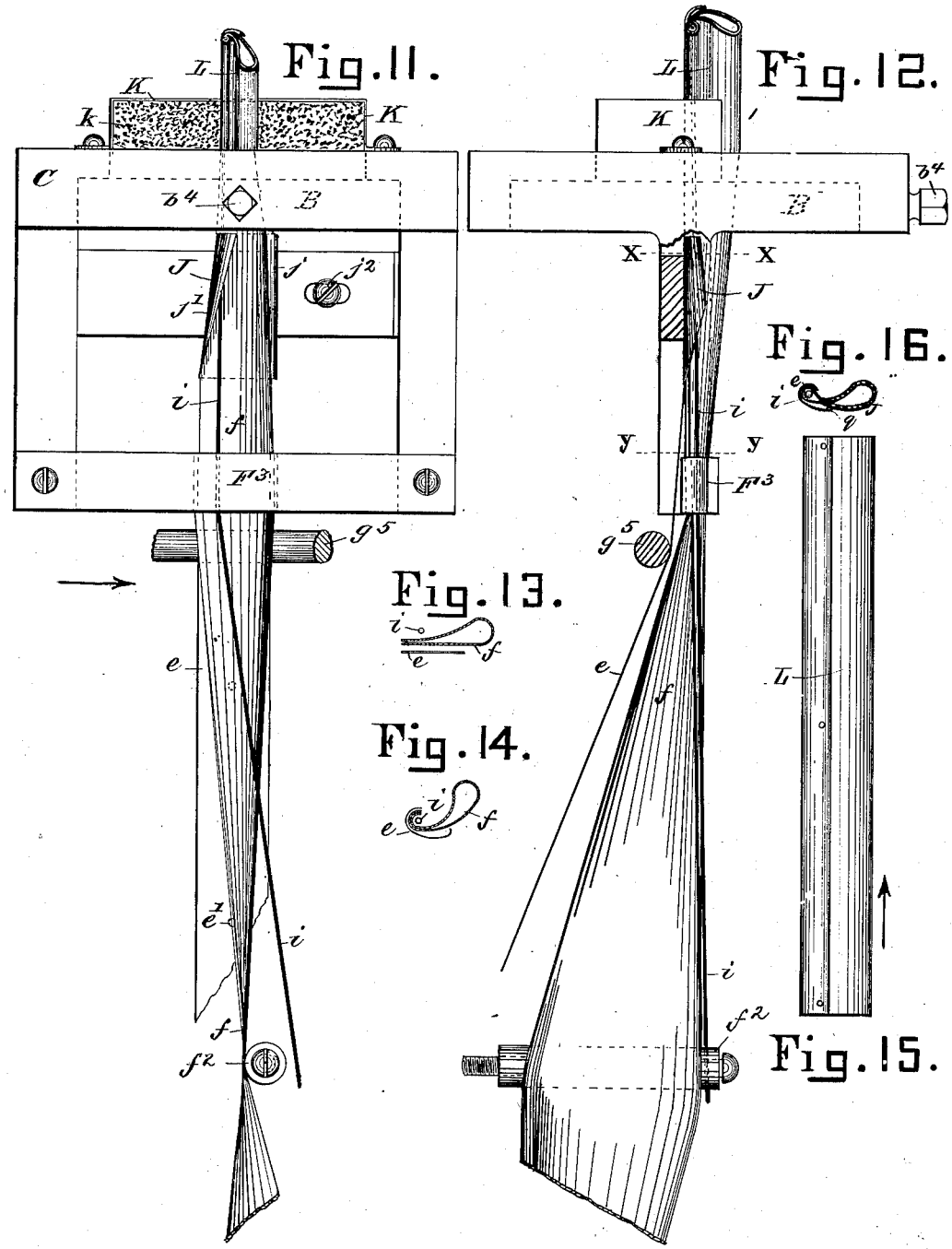

UNITED STATES PATENT OFFICE.

WILLIAM H. COSPER, OF CHICAGO, ILLINOIS.

MACHINE FOR MANUFACTURING WEATHER-STRIPPING.

SPECIFICATION forming part of Letters Patent No. 432,726, dated July 22, 1890.

Application filed February 26, 1890. Serial No. 341,904. (No model.)

*To all whom it may concern:*

Be it known that I, WILLIAM H. COSPER, a citizen of the United States, residing at Chicago, in the county of Cook and State of Illinois, have invented certain new and useful Improvements in Machines for the Manufacture of Weather-Stripping, of which the following is a full, clear, and exact description, reference being had to the accompanying drawings, and to the letters of reference marked thereon, which form part of this specification.

The invention relates to the manufacture of weather-stripping of the class wherein a closing-strip of flexible material, as of rubber, felt, or the like, is provided with a metallic backing or securing strip; and it consists in the matters hereinafter set forth, and pointed out in the appended claims.

The objects of the invention are, first, to provide means whereby weather-stripping of the class above referred to may be rapidly and economically manufactured in strips of substantially unlimited lengths; and, secondly, to provide means whereby the several materials of which such class of weather-stripping is composed may be mechanically combined in proper form for employment and otherwise produced in finished and marketable condition more desirably, rapidly, and inexpensively than by the means ordinarily employed in such art.

The main feature of the invention consists in the employment of a die through which the flexible material and a metallic strip are simultaneously drawn, the form of the die being such that as the two materials are advanced the metal is turned or formed in such a manner as causes it to suitably embrace the flexible material, the free or interstice closing portion of which is enabled, by reason of the peculiar conformation of the die, to pass therethrough without being in any manner impaired thereby.

Other notable features of the invention are embraced in the devices, and their operative arrangement for buffing, punching or perforating, and lacquering the metallic strip as it is carried forward, together with certain other devices and details of construction and arrangement, all of which are hereinafter fully set forth.

Figure 1:
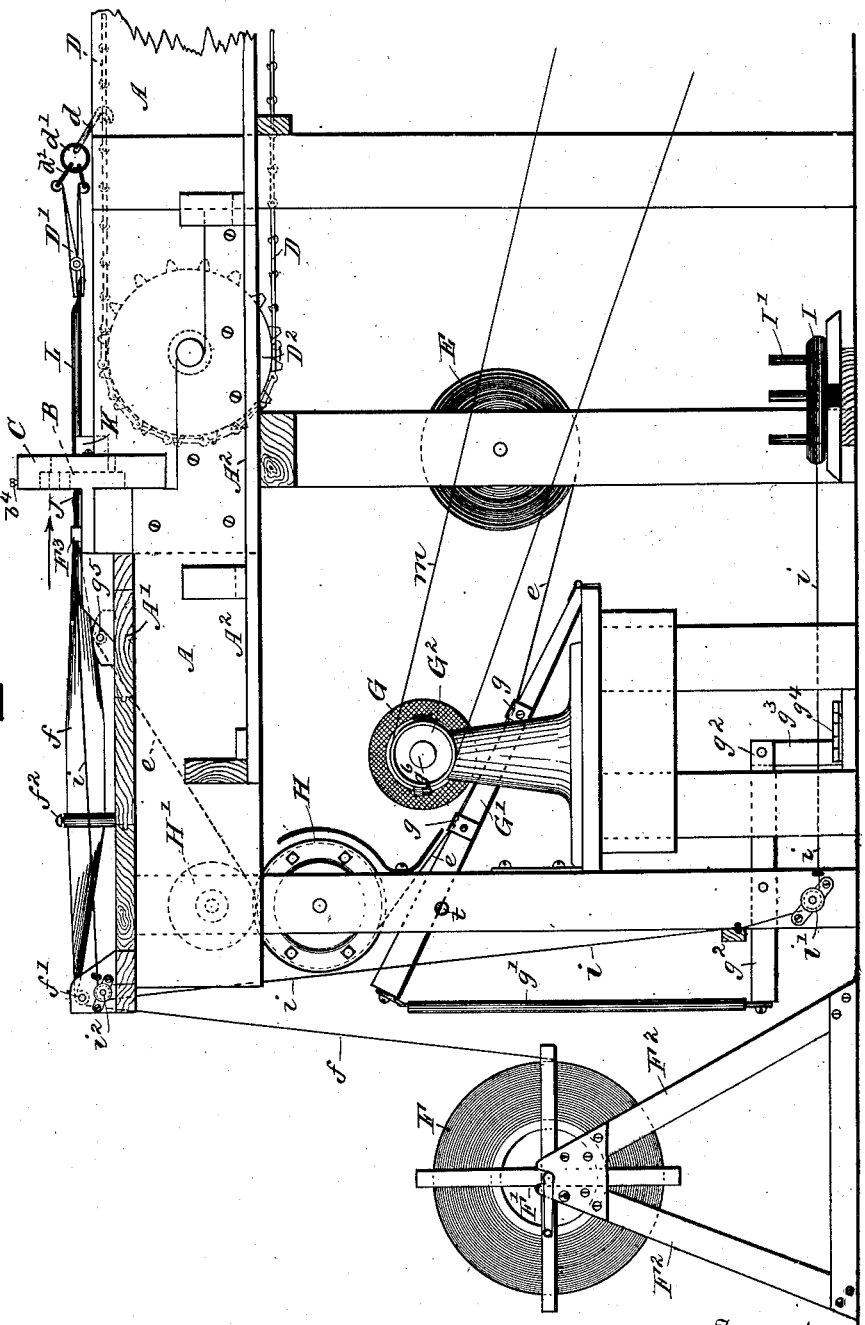
Figure 2:
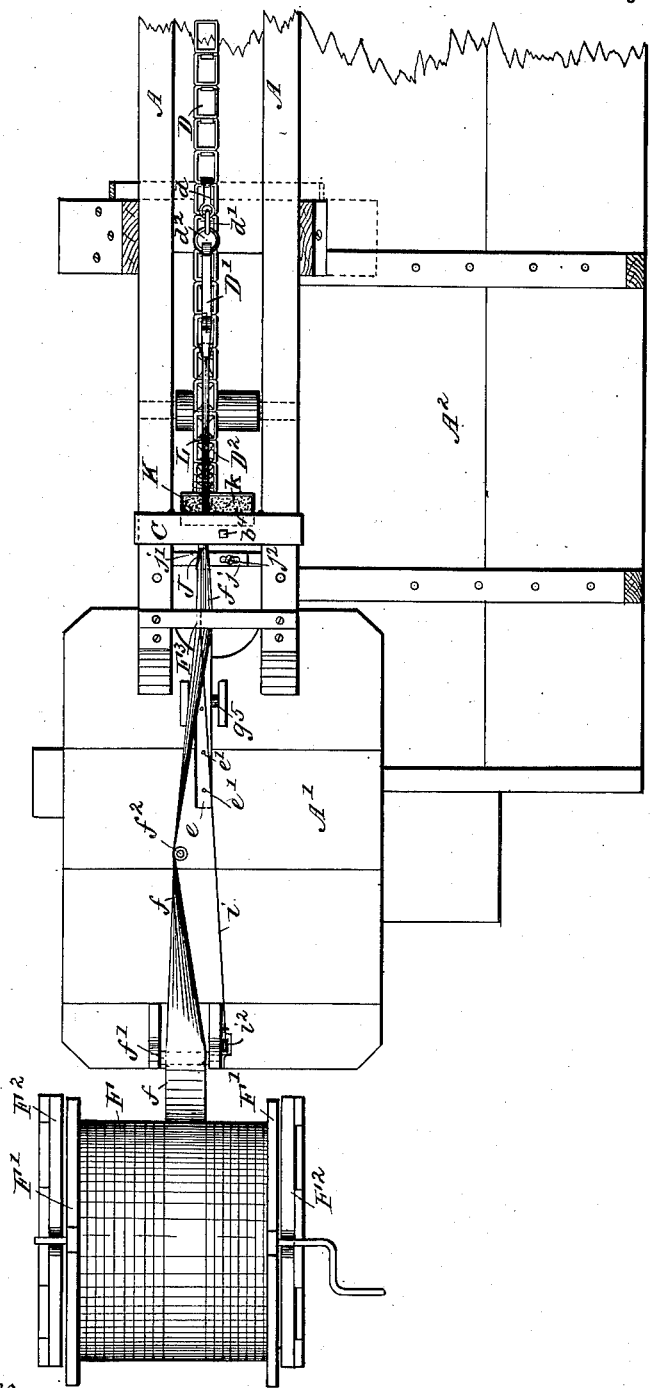
Figure 3:
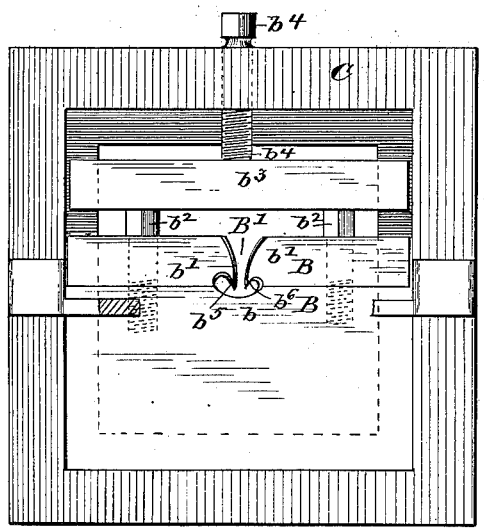
Figure 4:
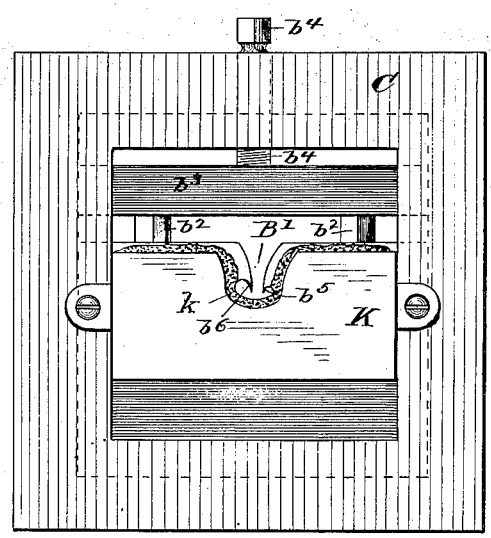
Figure 5:
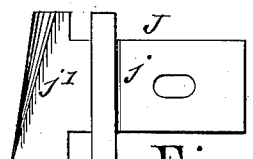
Figure 6:
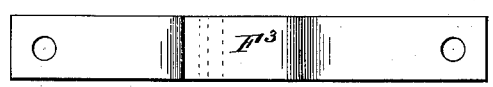
Figure 7:
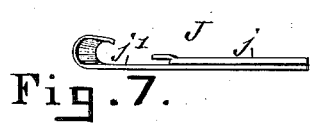
Figure 8:
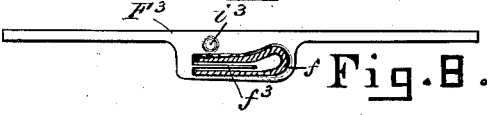
Figure 9:
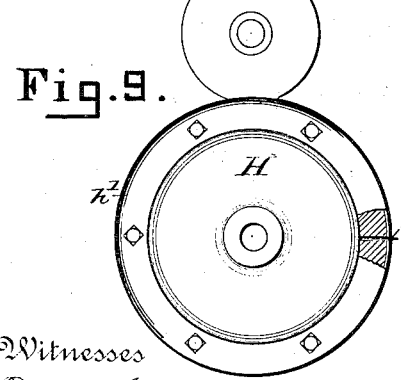
Figure 10:
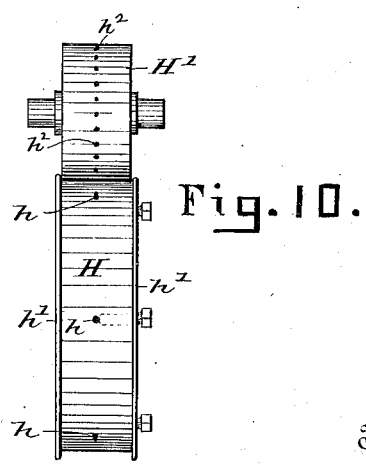

In the accompanying drawings, Figure 1 is a side elevation of a machine embodying the several features of my invention. Fig. 2 is a broken top plan view thereof. Fig. 3 is an end view of the strip-forming die and the frame in which the same is secured, looking in the direction indicated by the horizontally-drawn arrow shown in Fig. 1. Fig. 4 is an end view in reverse of the die and frame shown in said Fig. 3, the strip-lacquering device being also shown in said view. Fig. 5 is a top plan view of a former preferably employed adjacent to the strip-forming die for preliminarily in part bending and guiding the metallic strip to the forming-die. Fig. 6 is a top plan view of the flexible-strip guide located intermediate the flexible-strip spool and the forming-die. Fig. 7 is an end view of the said metallic-strip guide, looking in the direction indicated by the horizontally-drawn arrow shown in Fig. 1. Fig. 8 is an end view of said flexible-strip guide, looking in the direction indicated by the horizontally-drawn arrow shown in said Fig. 1. Figs. 9 and 10 are side and end elevations, respectively illustrating the metallic-strip punching or perforating devices. Fig. 11 is a broken top plan detail particularly intended to illustrate the manner in which the materials composing the weather-strip pass to the die and the form in which they are drawn therefrom. Fig. 12 is a broken side detail further illustrating the passage of the materials to and from the forming-die, the view being in the direction indicated by the transversely-drawn arrow shown in Fig. 11. Fig. 13 is a transverse sectional detail taken on the line Y Y of Fig. 12, showing the several materials as they are being advanced to the forming-die immediately following the passage of the flexible material through its guide above referred to. Fig. 14 is a transverse sectional detail taken on the line X X of Fig. 12, showing the form given to the metallic strip by its guide preliminary to the action of the forming-guide thereon. Fig. 15 is a top plan detail of the finished weather-stripping illustrated in the drawings under process of manufacture by the machine. Fig. 16 is a cross-section of said weather-stripping, looking in the direction indicated by the arrow shown in said Fig. 15.

Referring by letter to the details of construction and arrangement shown in the several above-described views, A is the main frame of the machine, and A' A² tables projecting longitudinally and laterally, respectively, therefrom.

B indicates the forming-die, and C the chuck or frame which carries the same, fixed to the frame A.

D D' D² indicate the devices which I preferably employ for drawing the weather-stripping through the die B, the same respectively consisting of an endless apron and gripping device and sprocket-wheels for carrying the apron, (as a matter of convenience with reference to space in the drawings but one of said wheels being shown.)

E refers to a coil of metal stripping conveniently sustained beneath the main frame; $e$, the metal passing from said coil to be operated upon by the several devices; F, the flexible material of suitable width wound upon a spool F', sustained by a frame F², located at or about the end of the machine; $f$, the said material passing from the spool to the forming devices; G G', the metallic buffing devices; H H', the metal-perforating devices; I, a coil of wire or other suitable filament carried by a spool I', located beneath the main frame, and $i$ the said filament passing from the coil into the machine.

F³ indicates a guide for folding the flexible material preliminary to its entering the forming-die with the metal; J, a guide for partially forming the metal strip preliminary to the action thereon of the die B; K K, the lacquering devices, and L the weather-stripping after having been finally operated upon.

Motion is given to the endless apron D desirably through the axle of the sprocket-wheel (not shown) and to the buffing-wheel G by means of a suitably-actuated belt $m$, which works upon a pulley G² fixed to the shaft of said wheel.

G' of the buffing devices is an arm hinged by one end to the frame upon which the buffing-wheel standard rests, being connected by its other end through the rod $g'$ with a pivoted lever $g^2$, in turn connected by an arm $g^3$ with a treadle $g^4$. The arm G' is provided with guides or clips $g$, under which the metal strip $e$ is caused to pass while being drawn forward, the main purpose of said guides being to hold the metal properly against the wheel G when the arm G' is carried into operative position, so as to insure its being thoroughly buffed. The arm G' may be held in operative position by means other than the treadle and its connecting devices—as, for example, by a pin inserted in the opening $t$ in the leg of the frame. (Shown in Fig. 1.)

The roller H is provided with lateral strip-guide flanges $h'$, and on its perimeter with perforating or punching projections $h$. The roller H' operates as a female die to said projections, and for the purpose of economy is composed of wood or other suitable material adapted to yield to the pressure of the said projections as the two rollers revolve, $h^2$ indicating (see Fig. 10) openings formed in its periphery by said projections. The metal to be perforated being very thin and usually quite soft—as, for example, copper—it is obvious that the simple means thus shown and described are sufficient for the accomplishment of the required work.

The guide F³ is given operative form in keeping with the shape to be given to the flexible material, the form of the said guide shown herein being such as will properly loop the material for the production of weather-stripping of the peculiar character shown herein and in Letters Patent No. 379,208, granted to me March 13, 1888. The tongue $f^3$ (shown projecting transverse the interior of said guide in Fig. 8) holds the folded portion of the material apart while passing therethrough and otherwise materially assists in guiding the same properly to the forming-die.

The guide J is preferably composed of two portions $j\,j'$, which are capable of adjustment toward and from each other, thus adapting the employment of one guide to varying widths of metal. The said guide is given such shape as causes the metallic strip to be partially upset or formed before entering the die B, thus lessening or in measure facilitating the work to be done by said die. This guide, however, is not essential to the proper service of the said die, as the die, if given sufficient length, may be adapted to the doing of the entire metal-forming work. The said die is tapered so as to present a gradually-decreasing area in the direction in which the materials are drawn, and has such other configuration as insures the forming of the moving metal into the desired shape, and the embracing or suitable overlapping of the flexible material thereby. The die is essentially provided with a slot B' or equivalent opening adapted to admit of the easy passage of the free portion of the flexible material coincident with the forming action of the die.

To form the metal as shown particularly in Fig. 16—that is, with the laps or curves $p$ and $q$—the die is formed to describe the lips $b^5\,b^6$, the said lips determining how much turn or curve shall be given to the several lateral margins of the metal.

In Fig. 3 the die is shown to be composed of two portions $b\,b'$, such arrangement being mainly for convenience of construction, repairs, and alteration. The upper portion $b'$ is held to the lower portion $b$ by means of set-screws $b^2$, the construction being rigidly secured in position within the chuck by means of a pressure-bar $b^3$, which, bearing upon the heads of such screws, is held thereto by an impinging set-screw $b^4$ seated in the upper portion of the chuck.

The lacquering devices, which consist of a sponge or equivalent substance $k$, saturated with the coating material and contained within a receptacle K, are desirably secured to the rear face of the chuck C, immediately contiguous to the die B, and act upon the metallic portion of the weather-strip as it passes from the die.

The gripping device D' preferably consists of a pair of ordinary pliers, which, by means of links $d^2$ and ring $d'$, are connected with a hook $d$, adapted to engage with the apron D.

The operation of the apparatus when constructed and arranged as herein set forth is as follows: The metal strip passes under the clips $g$, around the perforating-roller H, over the roller $g^5$, and under the guide $F^3$. The flexible strip passes over the roller $f^2$ alongside the vertical guide-roller $f^2$, and through the guide $F^3$. The filament passes around the roller $i'$, over the roller $i^2$, and thence through the opening $i^3$ formed in the guide $F^3$. The ends of the metallic and flexible strips being preliminarily tapered, so as to admit of their free passage through the die B, the filament and said strips are cojointly carried through the former J and said die and taken hold of by the gripping device, which is then hooked to the apron. The arm G' being located in operative position, and the buffing-wheel and apron being started in motion, the several materials pass toward the die, through which they are drawn in the form of perfect weather-stripping, the punching or perforating of the metal (which is manifestly for the purpose of enabling the securing of the strip in position through the employment of nails or tacks) being effected by the perforating devices at the proper moment, and the lacquering operation taking place, as set forth, as the strip emerges from the die. A strip of sufficient length being drawn, the motion of the apron is stopped and the strip severed near the die. The gripping device is again applied to the end of the strip, which projects from the die, and the apron is again started in motion, to be again interrupted when the proper length of strip shall have been drawn, and so on.

I employ the table $A^2$ for the convenience which its proximity affords for holding the finished weather-stripping as it is cut in lengths.

I do not limit myself to the exact form of construction of the die and formers herein, nor to the identical operative arrangement of the various devices shown and described, except as set forth in the appended claims, as changes may be made in the premises without departing from the intent and scope of the invention.

I therefore claim as my invention and desire to secure by Letters Patent—

1. In machines for manufacturing weather-stripping composed of metallic and flexible strips, the combination of a die adapted to admit of the continuous simultaneous passage therethrough of the metallic and flexible materials and to turn or form the metallic strip to cause it to embrace the flexible material, mechanism for drawing said materials through the die, and means for buffing the metallic strip as it is drawn toward the die.

2. In devices for manufacturing weather-stripping composed of metallic and flexible strips, the combination, with devices for drawing the said materials through the die, of a die adapted to form or turn the metallic strip in such manner that it is caused to embrace the flexible material, and provided with a slot or equivalent opening adapted to admit of the passage through the die of the free portion of the flexible material coincident with the forming of the metal, substantially as and for the purpose set forth.

3. In machines for manufacturing weather-stripping composed of metallic and flexible strips, the combination of a die adapted to admit of the continuous and simultaneous passage therethrough of the metallic and flexible materials and to turn or form the metallic strips into shape, which causes it to embrace the flexible material, and mechanism for drawing the material through said die, with devices for punching or perforating the metallic strip as it is drawn to the die, substantially as set forth.

4. In machines for manufacturing weather-stripping composed of metallic and flexible strips, the combination, with a die adapted to admit of the continuous and simultaneous passage therethrough of the metallic and flexible materials and to turn or form the metallic strip into shape, which causes it to embrace the flexible material, of mechanism for drawing the materials through the die, devices, substantially as described, for perforating the metal strip, and devices for buffing the metallic strip as it passes toward the die, substantially as and for the purpose set forth.

5. In machines for manufacturing weather-stripping composed of metallic and flexible strips, the combination, with a die adapted to admit of the continuous and simultaneous passage therethrough of the metallic and flexible materials and to turn or form the metallic strip into shape, which causes it to embrace the flexible material, of mechanism for drawing the materials through the die, devices for perforating the metallic strip while it passes toward the die, devices for buffing the metallic strip as it passes toward the die, and devices for lacquering the metal as the finished strip is drawn from the die, substantially as and for the purpose set forth.

6. In machines for manufacturing weather-stripping composed of metallic and flexible strips, the combination, with a die adapted to admit of the continuous and simultaneous passage therethrough of the metallic and flexible materials and to turn or form the metallic strip into shape, which causes it to embrace the flexible material, and mechanism for drawing the materials through the die, of a flexible-strip guide $F^3$, and the former J, located intermediate the source of supply to the machine of the materials and the die, substantially as and for the purpose set forth.

7. In a machine for manufacturing weather-stripping composed of metallic and flexible strips, the shaping or forming devices thereof, in combination with means for punching the metallic strip before it is shaped or formed, consisting of a roller H, having strip-guide flanges and punching devices on its periphery, and a roller H' adjacent to said roller H.

8. In a machine for manufacturing weather-stripping composed of metallic and flexible strips, a die constructed to admit of the continuous and simultaneous passage through it of said flexible and metallic strips and to turn or form the metallic strip into shape, which causes it to embrace said flexible strip, and means for drawing said strips through the die, in combination with a receptacle at the rear side of said die, through which receptacle the metallic strip passes, and lacquering devices in said receptacle contiguous to said metallic strip, substantially as described, and for the purposes specified.

9. In machines for manufacturing weather-stripping composed of metallic and flexible strips, the combination, with a die adapted to admit of the continuous and simultaneous passage therethrough of the metallic and flexible materials and to turn or form the metallic strip into shape, which causes it to embrace the flexible material, of mechanism for drawing the materials through the die, and a guide-strip located in front of said die, constructed to preliminarily fold the flexible material before it reaches the die.

10. In a machine for manufacturing weather-stripping composed in part of metal, the combination, with the shaping and forming devices thereof, of means for buffing and perforating the metal before it is shaped or formed, and an adjustable arm located adjacent to said buffing and perforating means, and serving to support said metal while being buffed and to guide said buffed metal to the perforating means.

11. In a machine for manufacturing weather-stripping composed in part of metal, the shaping or forming devices thereof, in combination with means for buffing the metal before it is shaped or formed, an adjustable arm for supporting the metal while being buffed, and means on said arm for holding the metal against displacement, as described.

12. In a machine for manufacturing weather-stripping composed of flexible and metallic strips, the combination of means for preliminarily folding the flexible strips, with means at the rear of said preliminary folder for bending the metallic strip over the preliminarily-folded flexible strip, and means for drawing said strips to and past said preliminary folder and bending device.

13. In a machine for manufacturing weather-stripping composed of flexible and metallic strips, the combination of a guide-strip for preliminarily folding the flexible strip and having an opening and a transverse tongue therein, as described, and means at the rear of said guide-strip for so bending the metallic strip that it will embrace the preliminarily-folded flexible strip, and means for drawing said strips to and past said guide-strip and metal-bending means.

14. In a machine for manufacturing weather-stripping composed of flexible and metallic strips, the combination, with a guide-strip through which said flexible strip passes, said guide-strip having an opening and a transverse tongue therein and serving to preliminarily fold the flexible strip, of a die at the rear of said guide-strip, said die being constructed to admit of the continuous and simultaneous passage through it of said flexible and metallic strips and to turn or form the metallic strip into a shape which causes it to embrace said flexible strip, and means for drawing said flexible strip through said guide-strip and both strips through said die.

WILLIAM H. COSPER.

Witnesses:
GEO. W. LEVIN,
RICHARD W. ROBINSON.